United States Patent
Reymond et al.

(10) Patent No.: US 10,737,974 B2
(45) Date of Patent: *Aug. 11, 2020

(54) GLAZING COMPRISING A CARBON-BASED UPPER PROTECTIVE LAYER

(71) Applicant: SAINT-GOBAIN GLASS FRANCE, Courbevoie (FR)

(72) Inventors: Vincent Reymond, Antony (FR); Uwe Schmidt, Falkenberg (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 64 days.

This patent is subject to a terminal disclaimer.

(21) Appl. No.: 15/538,371

(22) PCT Filed: Dec. 22, 2015

(86) PCT No.: PCT/FR2015/053738
§ 371 (c)(1),
(2) Date: Jun. 21, 2017

(87) PCT Pub. No.: WO2016/102901
PCT Pub. Date: Jun. 30, 2016

(65) Prior Publication Data
US 2017/0369367 A1   Dec. 28, 2017

(30) Foreign Application Priority Data

Dec. 23, 2014   (FR) ...................................... 14 63257

(51) Int. Cl.
C03C 17/36      (2006.01)
C03C 17/22      (2006.01)
C03C 17/34      (2006.01)

(52) U.S. Cl.
CPC ............ *C03C 17/366* (2013.01); *C03C 17/22* (2013.01); *C03C 17/3626* (2013.01); *C03C 17/3634* (2013.01); *C03C 17/3644* (2013.01); *C03C 17/3649* (2013.01); *C03C 17/3652* (2013.01); *C03C 17/3681* (2013.01); *C03C 17/3441* (2013.01); *C03C 2217/212* (2013.01); *C03C 2217/23* (2013.01); *C03C 2217/256* (2013.01); *C03C 2217/27* (2013.01); *C03C 2217/28* (2013.01); *C03C 2217/78* (2013.01); *C03C 2218/156* (2013.01)

(58) Field of Classification Search
CPC .............. C03C 17/3634; C03C 17/366; C03C 2217/78; C03C 17/3441; B32B 2307/412; B32B 2307/584
See application file for complete search history.

(56) References Cited

U.S. PATENT DOCUMENTS

| | | | |
|---|---|---|---|
| 2003/0129407 A1* | 7/2003 | Teer .................... | C23C 14/0605 428/408 |
| 2003/0143401 A1* | 7/2003 | Hukari ................ | C03C 17/3435 428/408 |
| 2005/0260419 A1 | 11/2005 | Hukari et al. | |
| 2007/0017624 A1* | 1/2007 | Thomsen .............. | B08B 7/0071 156/99 |
| 2010/0266823 A1 | 10/2010 | Hukari et al. | |
| 2012/0087005 A1 | 4/2012 | Reymond et al. | |
| 2012/0094075 A1* | 4/2012 | Peter ....................... | C03C 17/23 428/142 |

FOREIGN PATENT DOCUMENTS

| | | |
|---|---|---|
| WO | 2010/139908 A1 | 12/2010 |
| WO | 2010/142926 A1 | 12/2010 |

OTHER PUBLICATIONS

T.L. Chen, et al., "Paper; Graphene as an anti-permeation and protective layer for indium-free transparent electrodes," Nanotechnology, vol. 23, No. 39, 2012, XP020230097, 6 pages.
Y. Zhao, et al., "Electronic Supplementary Information for Highly Impermeable and Transparent Graphene as Ultra-Thin Protection Barrier of Ag thin Films," Journal of Materials Chemistry C, 2013, XP055223864, 4 pages.
International Search Report dated Mar. 17, 2016 in PCT/FR2015/053738 filed Dec. 22, 2015.

* cited by examiner

*Primary Examiner* — Scott R. Walshon
*Assistant Examiner* — Jasper Saberi
(74) *Attorney, Agent, or Firm* — Oblon, McClelland, Maier & Neustadt, L.L.P.

(57) ABSTRACT

A material includes a transparent substrate coated with a stack of thin layers acting on infrared radiation including at least one functional layer. The stack includes a carbon-based upper protective layer within which the carbon atoms are essentially in an $sp^2$ hybridization state and the upper protective layer is deposited above at least a part of the functional layer and exhibits a thickness of less than 1 nm.

18 Claims, No Drawings

GLAZING COMPRISING A CARBON-BASED UPPER PROTECTIVE LAYER

The invention relates to a material and to a process for obtaining a material, such as a glazing, comprising a transparent substrate coated with a stack of thin layers acting on infrared radiation comprising at least one functional layer.

Materials comprising stacks acting on infrared radiation are used in "solar control" glazings targeted at reducing the amounts of solar energy entering and/or in "low-e" glazings targeted at reducing the amount of energy dissipated toward the outside of a building or of a vehicle.

The functional layers are deposited between coatings based on dielectric materials which generally comprise several dielectric layers making it possible to adjust the optical properties of the stack.

There is currently an increasing demand for these materials to also exhibit esthetic characteristics (for them to be able to be rounded), mechanical characteristics (for them to be more resistant) or safety characteristics (for them not to injure in the event of breakage). This requires subjecting the substrates to heat treatments. The stack of thin layers must thus be optimized in order to retain its integrity and in particular to prevent it from detrimentally changing during the various transformation stages, such as stages of cutting, of washing, of shaping the edges, of assembling and/or of high-temperature heat treatments of tempering, annealing and/or bending type. It is common and practical to carry out the assembling and/or the various treatments on a site other than that where the substrate coated with the stack is manufactured. These substrates thus also undergo stages of storage and transportation.

The mechanical strength of these complex stacks is often insufficient, this being the case a fortiori when the functional layers are silver-based metal layers (or silver layers). This low strength is reflected by the appearance in the short term of defects, such as sites of corrosion, scratches, indeed even the complete or partial tearing of the stack during its use under standard conditions. All defects or scratches, whether due to corrosion or to mechanical stresses, are liable to detrimentally affect not only the attractiveness of the coated substrate but also its optical and energy performance levels.

Upper protective layers are conventionally used for various purposes, in particular in order to improve the scratch resistance, the wet corrosion resistance and the resistance to high-temperature heat treatments.

In the case of "solar control" or "low-e" glazings, the aim is generally not to significantly increase the absorption in the visible region. This constraint has to be taken into account in the choice of the materials constituting the stack and in particular the upper protective layers.

For example, upper protective layers based on titanium oxide or a mixed zinc tin oxide are known. These upper protective layers are not very absorbing. However, the substrates coated with such layers do not exhibit a satisfactory scratch resistance.

Despite the presence of these protective layers, scratches very often appear on the stack. However, in particular, once these scratches are created on a substrate, their visibility greatly increases when the substrate is subjected to a heat treatment of tempering type. The susceptibility to scratching of such materials is prejudicial in terms of esthetic qualities and of production output. This can result in an abnormally high reject rate, very particularly in the case where these materials are bent/tempered glazings.

It is also known to use layers of carbon in the graphite or amorphous form for improving the scratch resistance.

"DLC" ("Diamond-Like Carbon") amorphous carbon layers comprise carbon atoms in a mixture of $sp^2$ and $sp^3$ hybridization states. Such layers cannot be deposited by a conventional magnetron process. They are generally obtained by plasma-enhanced chemical vapor deposition (PECVD), by laser ablation, by arc sputtering or by ion beam deposition.

"Graphite" carbon layers comprise carbon atoms essentially in an $sp^2$ hybridization state. Such layers considerably increase the absorption in the visible region and infrared region of the material comprising them. Consequently, these layers are essentially used as temporary protective layer intended to be removed during a heat treatment, by oxidation to give carbon dioxide.

There exists a need to effectively protect substrates coated with stacks acting on infrared radiation comprising silver-based functional layers during the manufacturing, transformation, transportation and/or storage stages. There also exists a need to improve the scratch resistance of substrates coated with stacks acting on infrared radiation without modifying optical properties, such as the absorption in the visible region.

The applicant has discovered, surprisingly, that the use of an upper protective layer based on carbon and graphite type, with a thickness of less than 1 nm, deposited by cathode sputtering, makes it possible to obtain satisfactory protection from scratching.

The scratch resistance is improved without modifying the optical properties, such as the absorption in the visible region. A material comprising a substrate thus coated and protected can advantageously be used without distinction, tempered or untempered, even in applications requiring a high light transmission in the visible region.

The invention relates to a material comprising a transparent substrate coated with a stack of thin layers acting on infrared radiation comprising at least one functional layer, characterized in that the stack comprises a carbon-based upper protective layer within which the carbon atoms are essentially in an $sp^2$ hybridization state and the upper protective layer is deposited above at least a part of the functional layer and exhibits a thickness of less than 1 nm. Said functional layer and said carbon-based upper protective layer are not in contact with one another. This means that there exists at least one layer inserted between these two said layers; advantageously, it is at least one dielectric layer.

Contrary to the layers of amorphous carbon of DLC type, this thin carbon layer is deposited by simple cathode sputtering. This scratch-resistant protective layer makes it possible to very significantly improve the scratch resistance while being easy to deposit and having a low cost.

In order to improve the scratch resistance, conventional solutions consist in using "hard" layers, which are layers comprising materials which exhibit a high hardness, such as titanium oxide or amorphous carbon of DLC type.

The protective layer according to the invention differs markedly from these "hard" layers. The underlying mechanisms which make it possible to obtain a good protection from scratching appear to be based not on the hardness but on the lowering of the coefficient of the friction. The protective layer provides the role of friction-resistant layer.

This effect is easily observed by lightly rubbing, with a rag or paper, the surface of the substrate coated with a stack. In the absence of the protective layer according to the invention, the upper surface of the stack "catches". When the stack comprises a protective layer according to the invention, the surface is "sliding".

These results are confirmed by tribological measurements carried out with a polypropylene-based polymeric indenter. The use of a polymeric indenter is advantageous as this makes it possible in addition to give an account of the phenomena of friction which may occur during the transportation stages.

This is because the materials are generally transported using harp trolleys. These harp trolleys comprise metal strings coated with a polymeric sheath against which the materials are held. The contact between these strings and the stack, which can occur during the insertion of the materials and/or during their transportation, represent one of the main causes of the generation of scratches.

These tribological measurements have shown that the coefficient of friction of the polymeric indenter/material coated with the stack pair is lowered when the stack comprises a protective layer according to the invention. The improvement in the scratch resistance seems to be able to be connected to this decrease in the coefficient of friction.

The carbon-based upper protective layer used comprises carbon atoms forming carbon atom carbon bonds essentially in an $sp^2$ hybridization state. It is considered that the carbon atoms of the layer are essentially in an $sp^2$ hybridization state when at least 80%, at least 90%, indeed even at least 100%, of the carbon atoms are in an $sp^2$ hybridization state. The hybridization of the carbon atoms can be characterized by Fourier transform infrared (FTIR) spectroscopy.

The carbon layer according to the invention differs in this characteristic from the "DLC" layers, which are layers of optionally hydrogenated amorphous carbon comprising carbon atoms in a mixture of $sp^2$ and $sp^3$ hybridization states, preferably essentially the $sp^3$ hybridization state. The carbon atoms are not essentially in an $sp^2$ hybridization state.

The carbon-based upper protective layer comprises at least 95.0%, preferably at least 96.5% and better still at least 98.0% by weight of carbon with respect to the weight of the upper protective layer.

The upper protective layer of carbon according to the invention can be obtained by magnetic-field assisted cathode sputtering, for example using a graphite target. The atmosphere in the deposition chamber comprises a neutral gas, preferably argon.

According to one embodiment, the upper protective layer has a thickness:
of less than 1.0 nm, of less than or equal to 0.9 nm, of less than 0.8 nm, and/or
of greater than or equal to 0.1 nm, of greater than or equal to 0.2 nm, of greater than or equal to 0.5 nm.

According to an advantageous embodiment, the upper protective layer has a thickness strictly of less than 1.0 nm, preferably of between 0.2 and 0.8 nm. These thin carbon layers do not significantly modify the absorption in the visible region. These layers do not necessarily have to be removed even when high light transmissions in the visible region are desired.

The protective layer according to the invention contributes a significant improvement to the scratch resistance, in comparison with conventional protective layers based on titanium dioxide ($TiO_2$) on mixed zinc tin oxide ($SnZnO_x$). However, according to an advantageous embodiment, the stack additionally comprises a lower protective layer based on metals chosen from titanium, zinc, tin, zirconium and/or hafnium, these metals being in the metal, oxidized, nitrided or oxynitrided form. This lower protective layer can be chosen from a layer:

of titanium; of zirconium; of hafnium; of titanium and of zirconium; of titanium, of zirconium and of hafnium; of zinc and of tin;

of titanium nitride; of zirconium nitride; of hafnium nitride; of titanium and zirconium nitride; of titanium, zirconium and hafnium nitride;

of titanium oxide; of zirconium oxide; of hafnium oxide; of titanium and zirconium oxide; of titanium, zirconium and hafnium oxide; of zinc and tin oxide.

The lower protective layer has a thickness:
of less than or equal to 10 nm, of less than or equal to 7 nm, of less than or equal to 5 nm, of less than or equal to 4 nm, and/or
of greater than or equal to 1 nm, of greater than or equal to 2 nm or of greater than or equal to 3 nm.

The lower protective layer is preferably in contact with the upper protective layer.

The variation in the light absorption in the visible region ΔAbs. brought about by the upper protective layer is less than 10%, preferably less than 5% and better still less than 2%. The variation is obtained by measuring the light absorption of a substrate coated with a stack not comprising an upper protective layer (Abs. Ref.) and of one and the same coated substrate comprising the upper protective layer (Abs. Inv.) and by then carrying out the following calculation: ΔAbs.=(Abs. Ref.−Abs. Inv.).

All the light characteristics presented in the present description are obtained according to the principles and methods described in the European standard EN 410 relating to the determination of the light and solar characteristics of the glazings used in glass for the construction industry. Abs. is understood to mean, within the meaning of the present description, the absorption at normal incidence, under the D65 illuminant, with a field of vision of 2°.

The use of an upper protective layer exhibiting a low thickness results in excellent scratch resistance properties, while keeping the absorption in the visible region low.

The stack is deposited by magnetic-field-assisted cathode sputtering (magnetron process). According to this advantageous embodiment, all the layers of the stack are deposited by magnetic-field-assisted cathode sputtering.

Unless otherwise mentioned, the thicknesses alluded to in the present document are physical thicknesses and the layers are thin layers. Thin layer is understood to mean a layer exhibiting a thickness of between 0.1 nm and 100 micrometers.

Throughout the description, the substrate according to the invention is regarded as positioned horizontally. The stack of thin layers is deposited above the substrate. The meaning of the expressions "above" and "below" and "lower" and "upper" is to be considered with respect to this orientation. Unless specifically stipulated, the expressions "above" and "below" do not necessarily mean that two layers and/or coatings are positioned in contact with one another. When it is specified that a layer is deposited "in contact" with another layer or with a coating, this means that there cannot be one or more layers inserted between these two layers.

The functional layer is chosen from:
a functional metal layer based on silver or on a silver-containing metal alloy,
a functional metal layer based on niobium,
a functional layer based on niobium nitride.

The functional layers are preferably silver-based functional metal layers.

A silver-based functional metal layer comprises at least 95.0%, preferably at least 96.5% and better still at least 98.0% by weight of silver, with respect to the weight of the functional layer. Preferably, the silver-based functional metal layer comprises less than 1.0% by weight of metals other than silver, with respect to the weight of the silver-based functional metal layer The thickness of the functional layers, advantageously based on silver, is, in increasing order of preference, of from 5 to 20 nm, from 8 to 15 nm.

The functional layers, such as, for example, made of silver, are deposited between coatings based on dielectric materials which generally comprise several dielectric layers making it possible to adjust the optical properties of the stack. These dielectric layers make it possible in addition to protect the functional layer, advantageously made of silver, from chemical or mechanical attacks. The stack of thin layers thus advantageously comprises at least one functional metal layer, advantageously based on silver, and at least two coatings based on dielectric materials, each coating comprising at least one dielectric layer, so that each functional metal layer is positioned between two coatings based on dielectric materials.

The coatings based on dielectric materials exhibit a thickness of greater than 15 nm, preferably of between 15 and 50 nm and better still from 30 to 40 nm.

The dielectric layers of the coatings based on dielectric materials exhibit the following characteristics, alone or in combination:
 they are deposited by magnetic-field-assisted cathode sputtering,
 they are chosen from dielectric layers having a barrier function or having a stabilizing function,
 they are chosen from oxides or nitrides of one or more elements chosen from titanium, silicon, aluminum, tin and zinc,
 they have a thickness of greater than 5 nm, preferably of between 8 and 35 nm.

Dielectric layers having a barrier function is understood to mean a layer made of a material capable of forming a barrier to the diffusion of oxygen and water at high temperature, originating from the ambient atmosphere or from the transparent substrate, toward the functional layer. The dielectric layers having a barrier function can be based on silicon and/or aluminum compounds chosen from oxides, such as $SiO_2$, nitrides, such as silicon nitrides $Si_3N_4$ and aluminum nitrides AlN, and oxynitrides $SiO_xN_y$, optionally doped using at least one other element. The dielectric layers having a barrier function can also be based on zinc tin oxide.

Dielectric layers having a stabilizing function is understood to mean a layer made of a material capable of stabilizing the interface between the functional layer and this layer. The dielectric layers having a stabilizing function are preferably based on crystalline oxide, in particular based on zinc oxide, optionally doped using at least one other element, such as aluminum. The dielectric layer or layers having a stabilizing function are preferably zinc oxide layers.

The dielectric layer or layers having a stabilizing function can occur above and/or below at least one silver-based functional metal layer or each silver-based functional metal layer, either directly in contact with it or separated by a blocking layer.

According to an advantageous embodiment, the stack comprises a dielectric layer based on silicon and/or aluminum nitride located above at least a part of the functional layer. The dielectric layer based on silicon and/or aluminum nitride has a thickness:
 of less than or equal to 100 nm, of less than or equal to 50 nm or of less than or equal to 40 nm, and/or
 of greater than or equal to 15 nm, of greater than or equal to 20 nm or of greater than or equal to 25 nm.

The dielectric layer based on silicon and/or aluminum nitride is below the upper protective layer.

According to one embodiment, the dielectric layer based on silicon and/or aluminum nitride is below the lower protective layer, preferably in contact with the lower protective layer.

The upper protective layer is preferably the final layer of the stack, that is to say the layer furthest from the substrate coated with the stack.

The stacks can additionally comprise blocking layers, the function of which is to protect the functional layers by preventing possible damage related to the deposition of a coating based on dielectric materials or related to a heat treatment. According to one embodiment, the stack comprises at least one blocking layer located below and in contact with a silver-based functional metal layer and/or at least one blocking layer located above and in contact with a silver-based functional metal layer.

Mention may be made, among the blocking layers conventionally used, in particular when the functional layer is a silver-based metal layer, of blocking layers based on a metal chosen from niobium Nb, tantalum Ta, titanium Ti, chromium Cr or nickel Ni or based on an alloy obtained from at least two of these metals, in particular on an alloy of nickel and chromium (NiCr).

The thickness of each blocking overlayer or underlayer is preferably:
 at least 0.5 nm or at least 0.8 nm and/or
 at most 5.0 nm or at most 2.0 nm.

An example of a suitable stack according to the invention comprises:
 a coating based on dielectric materials located below a silver-based functional metal layer, it being possible for the coating to comprise at least one dielectric layer based on silicon and/or aluminum nitride,
 optionally a blocking layer,
 a silver-based functional metal layer,
 optionally a blocking layer,
 a coating based on dielectric materials located above the silver-based functional metal layer, it being possible for the coating to comprise at least one dielectric layer based on silicon and/or aluminum nitride,
 an upper protective layer.

The transparent substrates according to the invention are preferably made of a rigid inorganic material, such as made of glass, in particular soda-lime-silica glass, or of an organic material based on polymers (or made of polymer).

The organic transparent substrates according to the invention can also be made of polymer and are rigid or flexible. Examples of polymers which are suitable according to the invention comprise, in particular:
 polyesters, such as polyethylene terephthalate (PET), polybutylene terephthalate (PBT) or polyethylene naphthalate (PEN);
 polyacrylates, such as polymethyl methacrylate (PMMA);
 polycarbonates;
 polyurethanes;
 polyamides;
 polyimides;
 fluorinated polymers, such as fluoroesters, for example ethylene-tetrafluoroethylene (ETFE), polyvinylidene fluoride (PVDF), polychlorotrifluoroethylene (PCTFE), ethylene-chlorotrifluoroethylene (ECTFE) or fluorinated ethylene-propylene copolymers (FEP);

photocrosslinkable and/or photopolymerizable resins, such as thiolene, polyurethane, urethane-acrylate, polyester-acrylate resins, and
polythiourethanes.

The thickness of the substrate generally varies between 0.5 mm and 19 mm. The thickness of the substrate is preferably less than or equal to 6 mm, indeed even 4 mm.

The material, that is to say the transparent substrate coated with the stack, is thus not heat treated but it may be intended to undergo a high-temperature heat treatment chosen from an annealing, for example a flash annealing, such as a laser or flame annealing, a tempering and/or a bending. The temperature of the heat treatment is greater than 400° C., preferably greater than 450° C. and better still greater than 500° C. The implementation or not of a heat treatment on the material according to the invention will depend on the application for which said material is intended. The properties of the material according to the invention, demonstrated here, namely the scratch resistance, are independent of any one heat treatment. The substrate coated with the stack, forming the material according to the invention, can thus be bent and/or tempered. It is said that it can be tempered and/or bent.

The substrate coated with the stack can be is a bent and/or tempered glass.

The material can be in the form of a monolithic glazing, of a laminated glazing or of a multiple glazing, in particular a double glazing or a triple glazing.

The invention also relates to a process for the preparation of a material comprising a transparent substrate coated with a stack of thin layers deposited by cathode sputtering, optionally assisted by magnetic field; the process comprises the sequence of following stages:
- at least one functional layer is deposited on the transparent substrate, then
- at least one dielectric layer based on silicon and/or aluminum nitride is deposited above the functional layer, then
- a lower protective layer is optionally deposited,
- a carbon-based upper protective layer, within which the carbon atoms are essentially in an $sp^2$ hybridization state, is deposited by sputtering of a carbon target, preferably a graphite target; the upper protective layer exhibits a thickness of less than 1 nm.

The process can additionally comprise the stage during which the substrate coated with the stack of thin layers is subjected to a heat treatment at a temperature of greater than 400° C., preferably 500° C.

Finally, the invention relates to the use of a material as described above for manufacturing a glazing. It can, for example, be a building or vehicle glazing.

EXAMPLES

Stacks of thin layers defined below are deposited on substrates made of clear soda-lime glass with a thickness of 4 mm.

For these examples, the conditions for deposition of the layers deposited by sputtering ("magnetron cathode" sputtering) are summarized in table 1 below.

The layer of carbon of graphite type is deposited by magnetron sputtering of a graphite target under an atmosphere comprising argon at a low power of approximately 10 kW.

TABLE 1

|  | Targets employed | Deposition pressure | Gases | Index* |
|---|---|---|---|---|
| $Si_3N_4$ | Si:Al (92:8% by weight) | $2\text{-}15*10^{-3}$ mbar | Ar:30-60% – $N_2$:40-70% | 2.00 |
| AZO | Zn:Al (2% by weight) | $1.5*10^{-3}$ mbar | Ar 91% – $O_2$ 9% | 1.90 |
| NiCr | Ni:Cr (80:20% at.) | $1\text{-}5*10^{-3}$ mbar | Ar at 100% | — |
| Ag | Ag | $2\text{-}3*10^{-3}$ mbar | Ar at 100% | — |
| $TiO_2$ | $TiO_x$ | $1.5*10^{-3}$ mbar | Ar 88% – $O_2$ 12% | 2.32 |
| C | Graphite | $1.5*10^{-3}$ mbar | Ar at 100% | 2.25 | at.: by atoms;
*: at 550 nm

The substrates coated with stacks which are protected according to the invention can be tempered and can be bent.

| Glazing |  | Inv. 1 | Inv. 2 | Comp. |
|---|---|---|---|---|
| Upper protective layer | C | 0.8 | 0.8 | — |
| Lower protective layer | $TiO_x$ | 3 | 1.5 | 1.5 |
| Antireflective coating | $Si_3N_4$ | 35 | 35 | 35 |
|  | ZnO | — | 5 | 5 |
| Blocking layer BO | NiCr | 0.4 | 0.7 | 0.7 |
| Functional layer | Ag | 7 | 10 | 10 |
| Blocking layer BU | NiCr | 0.7 | 0.7 | 0.7 |
| Antireflective coating | ZnO | — | 5 | 5 |
|  | $Si_3N_4$ | 35 | 30 | 30 |
| Substrate (mm) | Glass | 4 | 4 | 4 |

Different tests were carried out on the material according to the invention in order to evaluate the mechanical strength of the stack:
Steel wool test,
Harp test.

The steel wool test and the harp test are two tests which consist in deliberately producing scratches at the surface of the material on the side of the stack.

The steel wool test consists in carrying out a certain number of two-and-fro movements by rubbing the coated material on the side of the stack with a piece of steel wool with a constant pressure.

The objective of the harp test is to simulate the rubbing conditions to which a substrate coated with a stack may be subjected in a harp trolley. This test consists of rubbing the coated material on the side of the stack with a string originating from a harp trolley.

These two tests were carried out on uncleaned substrates and on cleaned substrates. The cleaned substrates undergo, after producing the scratches, a cleaning stage consisting of several passes through a washing machine.

The substrates are subsequently tempered, for example at 650'C for 5 minutes. The state of the material is then assessed visually.

A grade is assigned as a function of the following scale of grades:
1: glass not or very slightly scratched (0 to 5 scratches),
2: glass slightly scratched (up to 20 scratches),
3: glass quite scratched (up to 50 scratches),
4: glass highly scratched (number of scratches greater than 50).

| Example | Test | Without cleaning | With cleaning |
|---|---|---|---|
| Comp. | Steel Wool | 4 | 4 |
|  | Harp | 3 | 3 |

-continued

| Example | Test | Without cleaning | With cleaning |
|---------|------|------------------|---------------|
| Inv. 2 | Steel Wool | 1 | 1 |
| | Harp | 1 | 1 |

The material according to the invention satisfies each of these tests and gives, from the viewpoint of the scratch resistance, excellent results. Furthermore, the washing stage does not modify the good scratch resistance properties obtained.

The invention claimed is:

1. A material comprising a transparent substrate coated with a stack of thin layers acting on infrared radiation and comprising, in the following order from the transparent substrate:
   a first coating based on dielectric materials;
   at least one functional layer;
   a second coating based on dielectric materials;
   a lower protective layer based on metals chosen from titanium, zinc, tin, zirconium and/or hafnium, these metals being in the metal, oxidized, nitrided or oxynitrided form, wherein the lower protective layer has a thickness from 1 nm to 4 nm; and
   a carbon-based upper protective layer within which the carbon atoms are essentially in an $sp^2$ hybridization state, wherein the upper protective layer has a thickness of less than 1 nm,
   wherein the variation in the light absorption in the visible region brought about by the carbon-based upper protective layer is less than 10%, and
   wherein the substrate is made of glass or made of polymer.

2. The material as claimed in claim 1, wherein the material is configured to undergo a heat treatment.

3. The material as claimed in claim 1, wherein the material is untempered.

4. The material as claimed in claim 1, wherein the material is tempered and bent.

5. The material as claimed in claim 1, wherein the lower protective layer is a layer of: titanium; zirconium; hafnium; titanium and zirconium; titanium, zirconium, and hafnium; or zinc and tin.

6. The material as claimed in claim 1, wherein the upper protective layer has a thickness of between 0.2 and 0.8 nm.

7. The material as claimed in claim 1, wherein the second coating comprises a dielectric layer based on silicon and/or aluminum nitride.

8. The material as claimed in claim 7, wherein the dielectric layer based on silicon and/or aluminum nitride has a thickness from 20 nm to 50 nm.

9. The material as claimed in claim 7, wherein the dielectric layer based on silicon and/or aluminum nitride is in contact with the lower protective layer.

10. The material as claimed in claim 1, wherein the functional layer is:
    a functional metal layer based on silver or on a silver-containing metal alloy,
    a functional metal layer based on niobium, or
    a functional layer based on niobium nitride.

11. The material as claimed in claim 1, wherein the stack of thin layers comprises at least one silver-based functional metal layer and at least two coatings based on dielectric materials, each coating comprising at least one dielectric layer, so that each functional metal layer is positioned between two coatings based on dielectric materials.

12. The material as claimed in claim 10, wherein the stack further comprises at least one blocking layer located below and in contact with a silver-based functional metal layer and/or at least one blocking layer located above and in contact with a silver-based functional metal layer,
    wherein the blocking layer or layers are based on a metal chosen from niobium Nb, tantalum Ta, titanium Ti, chromium Cr or nickel Ni or based on an alloy obtained from at least two of these metals.

13. The material as claimed in claim 10, wherein the stack comprises, in the following order from the transparent substrate:
    the first coating comprising at least one dielectric layer based on silicon and/or aluminum nitride;
    a silver-based functional metal layer;
    the second coating comprising at least one dielectric layer based on silicon and/or aluminum nitride;
    the lower protective layer; and
    the upper protective layer.

14. The material as claimed in claim 1, wherein the lower protective layer is a layer of: titanium nitride; zirconium nitride; hafnium nitride; titanium and zirconium nitride; or titanium, zirconium, and hafnium nitride.

15. The material as claimed in claim 1, wherein the lower protective layer is a layer of: titanium oxide; zirconium oxide; hafnium oxide; titanium and zirconium oxide; titanium, zirconium, and hafnium oxide; or zinc and tin oxide.

16. The material as claimed in claim 1, wherein the lower protective layer contacts the upper protective layer.

17. A process for preparing the material according to claim 1, the process comprising, in the following order:
    depositing a first coating based on dielectric materials on the transparent substrate;
    depositing at least one functional layer above the first coating;
    depositing a second coating based on dielectric materials above the functional layer;
    depositing a lower protective layer based on metals chosen from titanium, zinc, tin, zirconium and/or hafnium, these metals being in the metal, oxidized, nitrided or oxynitrided form above the second coating, wherein the lower protective layer has a thickness from 1 nm to 4 nm; and
    depositing a carbon-based upper protective layer, within which the carbon atoms are essentially in an $sp^2$ hybridization state, by sputtering of a carbon target, wherein the upper protective layer has a thickness of less than 1 nm,
    wherein the variation in the light absorption in the visible region brought about by the carbon-based upper protective layer is less than 10%, and
    wherein the substrate is made of glass or made of polymer.

18. A method, comprising:
    manufacturing a glazing with the material of claim 1.

* * * * *